US006656365B2

(12) United States Patent
Suzuki et al.

(10) Patent No.: US 6,656,365 B2
(45) Date of Patent: Dec. 2, 2003

(54) PROCESS FOR PREVENTING FORMATION OF SCALE

(75) Inventors: Takashi Suzuki, Ebina (JP); Akihide Hirano, Singapore (SG); Hermann Kempen, Meerbusch (DE); Katsuhiro Ishikawa, Yokohama (JP); Masahiro Shiratani, Tsuchiura (JP)

(73) Assignee: Kurita Water Industries Ltd., Tokyo (JP)

( * ) Notice: Subject to any disclaimer, the term of this patent is extended or adjusted under 35 U.S.C. 154(b) by 41 days.

(21) Appl. No.: 10/007,181

(22) Filed: Oct. 19, 2001

(65) Prior Publication Data

US 2002/0195583 A1 Dec. 26, 2002

(30) Foreign Application Priority Data

Mar. 21, 2001 (JP) .......................................... 2001-081329

(51) Int. Cl.⁷ .............................. C02F 1/78; C02F 5/10
(52) U.S. Cl. ...................... 210/701; 210/698; 210/760; 252/180; 422/28
(58) Field of Search ........................... 252/180; 210/760, 210/698, 701; 422/28

(56) References Cited

U.S. PATENT DOCUMENTS

| | | | | |
|---|---|---|---|---|
| 3,928,196 A | * | 12/1975 | Persinski et al. ....... | 252/180 X |
| 4,029,577 A | * | 6/1977 | Godlewski et al. ...... | 252/180 X |
| 4,560,481 A | * | 12/1985 | Hollander ................ | 252/180 X |
| 4,618,448 A | * | 10/1986 | Cha et al. .................... | 252/180 |
| 4,671,880 A | * | 6/1987 | Wisener et al. .......... | 252/180 X |
| 4,784,774 A | * | 11/1988 | Amjad et al. ............ | 252/180 X |
| 4,900,451 A | * | 2/1990 | Michael et al. .......... | 252/180 X |
| 4,936,987 A | * | 6/1990 | Persinski et al. ........ | 252/180 X |
| 4,997,571 A | | 3/1991 | Roensch et al. ............. | 210/698 |
| 5,169,537 A | * | 12/1992 | Chen ........................ | 252/180 X |
| 5,171,451 A | * | 12/1992 | Khambatta et al. ...... | 210/760 X |
| 5,282,976 A | * | 2/1994 | Yeung ..................... | 210/698 X |
| 5,346,626 A | * | 9/1994 | Momozaki et al. ...... | 210/698 X |
| 5,662,803 A | * | 9/1997 | Young ..................... | 252/180 X |
| 5,716,529 A | * | 2/1998 | Suzuki et al. ............ | 252/180 X |
| 6,210,586 B1 | * | 4/2001 | Lo Sasso ................. | 210/698 X |

FOREIGN PATENT DOCUMENTS

| | | |
|---|---|---|
| EP | 0 516 305 A1 | 12/1992 |
| EP | 0 801 032 A1 | 10/1997 |
| JP | 5-123698 | 5/1993 |
| JP | 5-123698 A | 5/1993 |

* cited by examiner

Primary Examiner—Richard D. Lovering
(74) Attorney, Agent, or Firm—Frishauf, Holtz, Goodman & Chick, P.C.

(57) ABSTRACT

A process for preventing formation of scale which comprises adding, into a water system in which ozone is used for disinfection, a polymeric scale inhibitor having a high molecular weight which gives an average molecular weight within an optimum range for preventing formation of scale after the polymeric scale inhibitor is decomposed with ozone. In accordance with the process, the polymeric scale inhibitor having an average molecular weight within the optimum range for preventing formation of scale is present in the water system in which ozone is used for disinfection and formation of scale is effectively prevented.

19 Claims, No Drawings

PROCESS FOR PREVENTING FORMATION OF SCALE

BACKGROUND OF THE INVENTION

1. Field of the Invention

The present invention relates to a process for preventing formation of scale. More particularly, the present invention relates to a process for preventing formation of scale in accordance with which a polymeric scale inhibitor having an average molecular weight within the optimum range for preventing formation of scale is present in a water system in which ozone is used for disinfection and formation of scale is effectively prevented.

2. Description of Related Art

In cooling water systems and water supply systems, polymers having carboxyl group have been used as scale inhibitors and antifouling agents to prevent attachment of scale on the surface of metals contacting water, deposition of sludge and local corrosion under the fouling. In these water systems, in general, disinfection is conducted to prevent growth of microorganisms and formation of slime. As the process for disinfection, the treatment with chlorine is widely conducted. However, in water systems polluted with organic substances, agents containing chlorine occasionally cause formation of organohalogen compounds which are suspected to be carcinogenic and the use of the agents containing chlorine are being restricted. As the sufficiently safe process for disinfection which can replace the treatment with chlorine, the treatment with ozone is increasing. In the treatment with chlorine, polymeric scale inhibitors are chemically stable and the effect of preventing formation of scale is not adversely affected by the treatment with chlorine. However, in the treatment with ozone, polymeric scale inhibitors are decomposed and the molecular weight of the polymeric scale inhibitors decreases since ozone has stronger oxidizing ability than the agents containing chlorine. The average molecular weight of a polymeric scale inhibitor has an optimum range in order to exhibit the effect of preventing formation of scale. The effect decreases when the average molecular weight is either greater or smaller than the optimum range.

Heretofore, polymeric scale inhibitors having an average molecular weight within the optimum range are added to water without taking the decrease in the molecular weight of the polymeric scale inhibitor due to the decomposition into consideration and prevention of troubles caused by attachment of scale and deposition of sludge has been attempted. For example, in Japanese Patent Application Laid-Open No. Heisei 5(1993)-123698, a process for treatment of recycled cooling water using a homopolymer or a copolymer of acrylic acid or methacrylic acid having a weight-average molecular weight of 1,500 to 35,000 is proposed. However, it was found by the present inventors that, when the above process was applied to a water system in which disinfection was conducted in accordance with the treatment with ozone, the polymeric scale inhibitor was oxidized and decomposed with ozone. The molecular weight decreased and the effect of preventing formation of scale of the polymeric scale inhibitor decreased.

SUMMARY OF THE INVENTION

The present invention has an object of providing a process in accordance with which the polymeric scale inhibitor having an average molecular weight within an optimum range for preventing formation of scale is present in a water system in which ozone is used for disinfection and the formation of scale is effectively prevented.

As the result of extensive studies by the present inventors, it was found that the formation of scale could be effectively prevented in a specific water system in which ozone was used for disinfection when the optimum range of the average molecular weight for preventing formation of scale and the relation between the rate of supply of ozone and the rate of decomposition of the polymeric scale inhibitor were obtained and a polymeric scale inhibitor having the initial average molecular weight which gives an average molecular weight within the optimum range for preventing formation of scale after the polymeric scale inhibitor was decomposed with ozone was added to the water system. The present invention has been completed based on the knowledge.

The present invention provides:

(1) A process for preventing formation of scale which comprises adding, into a water system in which ozone is used for disinfection, a polymeric scale inhibitor having a high molecular weight which gives an average molecular weight within an optimum range for preventing formation of scale after the polymeric scale inhibitor is decomposed with ozone;

(2) A process described in (1), wherein the polymeric scale inhibitor is a polymer selected from homopolymers and copolymers of acrylic acid, methacrylic acid, maleic acid, maleic anhydride and itaconic acid; and (3) A process described in (1), which comprises (1) obtaining, in accordance with a measurement, the optimum range of the average molecular weight for preventing formation of scale from a relation between an average molecular weight of the polymeric scale inhibitor and an effect of preventing formation of scale; (2) obtaining, in accordance with a measurement, a relation between a rate of supply of ozone and a rate of decomposition of the polymeric scale inhibitor; (3) obtaining an initial average molecular weight of the polymeric scale inhibitor which gives an average molecular weight within the optimum range for preventing formation of scale after the polymeric scale inhibitor is decomposed with ozone from the rate of supply of ozone and a period of time of contact between the polymeric scale inhibitor and ozone; and (4) adding the polymeric scale inhibitor having the obtained initial average molecular weight into the water system.

DESCRIPTION OF THE PREFERRED EMBODIMENTS

In the process for preventing formation of scale, a polymeric scale inhibitor having a high molecular weight which gives an average molecular weight within the optimum range for preventing formation of scale after the polymeric scale inhibitor is decomposed with ozone is added into a water system in which ozone is used for disinfection. The components of the scale to which the process of the present invention can be applied is not particularly limited. Examples of the components of scale include calcium carbonate, calcium sulfate, calcium sulfite, calcium fluoride, calcium silicate, calcium phosphate, calcium oxalate, zinc phosphate, zinc hydroxide, zinc carbonate, zinc silicate, magnesium silicate, magnesium hydroxide, ferric hydroxide, iron oxide, mud and flocks of microorganisms.

It is preferable that the present invention is conducted in accordance with the following steps:

(1) The optimum range of the average molecular weight for preventing formation of scale is obtained from the relation between the average molecular weight of the polymeric scale inhibitor which is used as the scale inhibitor (the dispersant) in the water system and the effect of preventing formation of scale with respect to various types of substances forming scale and suspended substances. In the present invention, the method for measuring the average molecular weight of the polymeric scale inhibitor is not particularly limited as long as the same method is used. Examples of the method include the osmotic pressure method, the solution viscosity method, the light scattering method, the ultracentrifugation method and the gel permeation chromatography (GPC). Among these methods, GPC can be preferably used.

Polymeric scale inhibitors which have the same composition and different average molecular weights can be obtained by synthesizing polymeric scale inhibitors having different average molecular weights by polymerization under varied conditions or, alternatively, by synthesizing a polymeric scale inhibitor having a high molecular weight, which was then decomposed by bringing into contact with ozone in water. To obtain data on the relation between the average molecular weight of the polymeric scale inhibitor and the effect of preventing formation of scale, the decomposition of a polymeric scale inhibitor having a high molecular weight with ozone is advantageous since polymeric scale inhibitors having continuously varied average molecular weights can be obtained.

The effect of preventing formation of scale (the dispersion effect) of a polymeric scale inhibitor with respect to a component of the scale can be evaluated by preparing a supersaturated solution of the component for the evaluation, adding the polymeric scale inhibitor to the prepared solution and then obtaining the concentration of the polymeric scale inhibitor necessary for preventing separation and precipitation of the component. When the component of the scale is a suspended substance, the effect of preventing formation of scale of a polymeric scale inhibitor can be evaluated by preparing a suspension of the substance, adding the polymeric scale inhibitor to the prepared suspension and then obtaining the concentration of the polymeric scale inhibitor necessary for decreasing the speed of sedimentation of the suspended substance. Data on the relation between the molecular weight of a polymeric scale inhibitor and the effect of preventing formation of scale can be obtained also by measuring the rate of attachment of scale on a surface of heat transfer.

(2) An aqueous solution of the polymeric scale inhibitor is prepared. Ozone is continuously supplied to the prepared solution and the change in the molecular weight of the polymeric scale inhibitor with time is measured. In this measurement, the concentration of the polymeric scale inhibitor, the rate of supply of ozone, the concentration of ozone, the period of time of supply of ozone and the temperature of water are changed and the relations between the rate of decomposition of the polymeric scale inhibitor and the rate of supply of ozone or the concentration of ozone are obtained from the obtained data.

(3) In the object water system in which ozone is used for disinfection, the concentration of the polymeric scale inhibitor, the rate of supply of ozone and the retention time of the polymeric scale inhibitor in the system are confirmed. Using the data obtained in (2), the initial average molecular weight of the polymeric scale inhibitor which is required for maintaining the average molecular weight within the optimum range and exhibiting the effect of preventing formation of scale after the polymeric scale inhibitor is decomposed with ozone in the water system and the molecular weight is decreased, is obtained.

(4) The polymeric scale inhibitor having the initial molecular weight obtained in (3) is added to the water system to which the process of the present invention is applied. In accordance with the above process, the polymeric scale inhibitor is decomposed with ozone and, after the polymeric scale inhibitor has been decomposed, the average molecular weight of the polymeric scale inhibitor in the water system is adjusted within the optimum range which can exhibit the effect of preventing formation of scale. Therefore, the decrease in the effect of preventing formation of scale which is found in conventional processes due to decomposition of polymeric scale inhibitors can be prevented.

It is preferable that the polymeric scale inhibitor which is used in the present invention is a polymer having carboxyl group and more preferably a polymer selected from homopolymers and copolymers of acrylic acid, methacrylic acid, maleic acid, maleic anhydride and itaconic acid. The copolymers of acrylic acid, methacrylic acid, maleic acid, maleic anhydride and itaconic acid may be copolymers obtained from these monomers or copolymers obtained from these monomers and other monomers copolymerizable with these monomers. The copolymers of acrylic acid, methacrylic acid, maleic acid, maleic anhydride and itaconic acid may be copolymers having two types of monomer units, terpolymers having three types of monomer units or copolymers having four or more types of monomer units.

The other monomer which is copolymerized with acrylic acid, methacrylic acid, maleic acid, maleic anhydride or itaconic acid is not particularly limited. Examples of the other monomer include (meth)acrylamide, 2-hydroxyethyl (meth)acrylate, 2-hydroxypropyl (meth)acrylate, 2-methyl-1,3-butadiene-1-sulfonic acid, 2-methyl-1,3-butadiene-3-sulfonic acid, 2-methyl-1,3-butadiene-4-sulfonic acid, 1,3-pentadiene-1-sulfonic acid, 1,3-pentadiene-2-sulfonic acid, 1,3-pentadiene-3-sulfonic acid, 1,3-pentadiene-4-sulfonic acid, 2,3-dimethyl-1,3-butadiene-1-sulfonic acid, 2-methyl-1,3-pentadiene-4-sulfonic acid, 3-methyl-1,3-pentadiene-1-sulfonic acid, 2-methyl-1,3-butadiene-1,3-disulfonic acid, 2-methyl-1,3-butadiene-1,4-disulfonic acid, (meth)acrylamido-2-methyl-ethanesulfonic acid, (meth)acrylamido-2-methylpropanesulfonic acid, 3-allyloxy-2-hydroxypropanesulfonic acid, vinylsulfonic acid, acid phosphooxyethyl (meth)acrylate, acid phosphooxyethylene glycol mono(meth)acrylate, (meth)acrylonitrile, methyl (meth)acrylate, glycidyl (meth)acrylate, N-methylol(meth)acrylamide, styrene, α-methylstyrene, styrenesulfonic acid, vinyltoluene, vinyl acetate and salts of these monomers. The above monomer may be used singly or in combination of two or more.

The process of the present invention can be applied also when agents other than the above scale inhibitor and ozone such as corrosion inhibitors for metals, chelating agents, scale inhibitors which are not polymeric (dispersants) and disinfectants other than ozone are used in combination in the object water system. Examples of the corrosion inhibitors for metals include salts of multivalent metals such as salts of zinc and salts of nickel; salts of phosphonic acids such as salts of hydroxyethylidenediphosphonic acid; salts of phosphonocarboxylic acids such as salts of phosphonobutanetricarboxylic acid; salts of polymeric phosphoric acids such as salts of orthophosphoric acid and hexametaphosphoric acid; esters of phosphoric acid; azoles; and amines. Examples of the scale inhibitors which are not polymeric include salts of phosphonic acids, salts of phosphonocarboxylic acids, salts of polymeric phosphoric acids and esters of phosphoric acid. Examples of the disinfectant other than ozone include quaternary phosphonium salts, quaternary ammonium salts, organic halogen compounds such as chlorinated methylisothiazoline, chlorinated or brominated methylhidantoin, 2-bromo-2-nitro-1,3-propanediol and 2,2-dibromo-3-nitrilopropionamide, glutaraldehyde and methylene bisthiocyanate.

The process for preventing formation of scale of the present invention can be applied to a water system in which, when a conventional process is applied, the average molecular weight of a polymeric scale inhibitor decreases below the optimum range of the average molecular weight and the effect of preventing formation of scale decreases due to decomposition of the polymeric scale inhibitor with ozone used for disinfection. In accordance with the process of the present invention, the average molecular weight obtained after the polymeric scale inhibitor is decomposed with ozone is estimated and the initial molecular weight of the polymeric scale inhibitor is adjusted in a manner such that the average molecular weight obtained after the polymeric scale inhibitor is decomposed with ozone is within the optimum range of the average molecular weight. The polymeric scale inhibitor having the average molecular weight thus adjusted is added to the water system and an excellent effect of preventing formation of scale can be exhibited. In accordance with the process of the present invention, attachment or deposition of scale, sludge, corrosion products and slime on heating tubes, heat exchangers, condensers, polymerization reactors and piping can be prevented and problems such as hindrance of heat transfer, a decrease in the flow rate and local corrosion can be effectively prevented.

EXAMPLES

The present invention will be described more specifically with reference to examples in the following. However, the present invention is not limited to the examples.

Example 1

Determination of the Optimum Range of the Average Molecular Weight

[Synthesis of a Terpolymer]

Into a four-necked flask equipped with a stirrer, a reflux condenser, a dropping funnel and an inlet for nitrogen gas, water as the solvent and hydrogen peroxide as the polymerization initiator were placed and the atmosphere inside the flask was purged with nitrogen. While the flask was heated, an aqueous solution containing isoprenesulfonic acid, acrylic acid and 2-hydroxyethyl methacrylate (the ratio of the amounts by mole: 20/70/10) was added dropwise. After the addition was completed, the polymerization was allowed to further proceed. Then, an aqueous solution of sodium hydroxide was added and the solution was partially neutralized. The rate of addition of the aqueous solution of the monomers, the polymerization temperature, the amount of used hydrogen peroxide and the polymerization time after the addition of the aqueous solution of the monomers was completed were changed and 9 types of terpolymers having average molecular weights of 100,000, 50,000, 30,000, 26,000, 16,000, 13,000, 11,000, 8,000 and 6,000 were obtained. The average molecular weight was measured in accordance with GPC using sodium polystyrenesulfonate as the reference.

[Test of Formation of Gel with Calcium Ion]

Into a 500 ml conical beaker, desalted water, a pH buffer solution containing boric acid and sodium borate, an aqueous solution of a terpolymer and an aqueous solution of calcium chloride were added successively and 500 ml of a test solution having a pH of 8.5, a concentration of the terpolymer of 100 mg/liter and a calcium hardness of 50 mg $CaCO_3$/liter was prepared. The amount of the used aqueous solution of calcium chloride was changed and test solutions having calcium hardnesses of 100, 200, 300, 400, 500, 600, 700, 800, 900, 1,000 and 1,100 mg $CaCO_3$/liter were further prepared in accordance with the same procedures as those conducted above. The conical beakers were sealed with polyethylene films, placed in a thermostatted water bath kept at 90° C. and left standing there for 1 hour. Then, turbidity of the test solutions with gel formed by binding of the terpolymer and calcium ion was measured. The greatest calcium hardness which caused no turbidity in the test solution was defined as the threshold calcium hardness in gel formation of a terpolymer. The greater the threshold calcium hardness in gel formation of a terpolymer, the more stable the calcium component, staying dissolved in water without forming scale.

[Test of Prevention of Precipitation of Calcium Phosphate]

Into a 500 ml conical beaker, desalted water, a pH buffer solution containing boric acid and sodium borate, an aqueous solution of calcium chloride, an aqueous solution of a terpolymer and an aqueous solution of sodium phosphate were added successively and 500 ml of a test solution having a pH of 8.6, a concentration of the terpolymer of 3 mg/liter, a calcium hardness of 100 mg $CaCO_3$/liter and a concentration of phosphate ion of 10 mg $PO_4^{3-}$/liter was prepared. The conical beaker was sealed with a polyethylene film and placed in a thermostatted water bath kept at 60° C. After 40 hours, the test solution was filtered through a filter paper having a pore diameter of 0.1 $\mu$m and the concentration of the residual phosphate ion in the obtained filtrate was measured. The amount of the aqueous solution of the terpolymer was changed and the same procedures as those described above were conducted. Thus, test solutions having the concentrations of the terpolymer of 4, 5, 6, 7, 8, 9, 10, 11 and 12 mg/liter were further prepared and the same measurement as the above was conducted in accordance with the same procedures as those conducted in the above. The smallest concentration of the terpolymer which gave a residual concentration of phosphate ion of 9 mg $PO_4^{3-}$/liter or greater (a residual fraction of 90% or greater) was defined as the threshold terpolymer concentration for preventing calcium phosphate precipitation. The smaller the threshold terpolymer concentration for preventing calcium phosphate precipitation, the more excellent the effect of preventing formation of scale with respect to calcium phosphate.

[Test of Prevention of Precipitation of Iron Hydroxide]

Into a 500 ml conical beaker, desalted water, an aqueous solution of a terpolymer, an aqueous solution of sodium hydrogencarbonate, an aqueous solution of sodium silicate No. 3, an aqueous solution of calcium chloride, an aqueous solution of magnesium sulfate and an aqueous solution of iron(III) chloride were added successively. Finally, pH of the solution was adjusted with a 1% by weight aqueous solution of sulfuric acid or a 1% by weight aqueous solution of sodium hydroxide and 500 ml of a test solution having a pH of 8.8, a concentration of the terpolymer of 3 mg/liter, a calcium hardness of 250 mg $CaCO_3$/liter, magnesium hardness of 100 mg $CaCO_3$/liter, a degree of M alkali of 250 mg $CaCO_3$/liter, a concentration of silica of 100 mg $SiO_2$/liter and a concentration of total iron of 10 mg Fe/liter was prepared. The conical beaker was sealed with a polyethylene film and placed in a thermostatted water bath kept at 30° C. After being left standing there for 20 hours, the beaker was taken out and the concentration of iron dissolved in the supernatant solution was measured. The amount of the aqueous solution of the terpolymer was changed and the same procedures as those described above were conducted. Thus, 500 ml each of test solutions having the concentrations of the terpolymer of 4, 5, 6, 7, 8, 9, 10, 11 and 12 were further prepared and the same measurement as the above was conducted in accordance with the same procedures as those conducted in the above. The smallest concentration of the terpolymer which gave the residual concentration of iron ion of 9 mg Fe/liter or greater (a residual fraction of 90% or greater) was defined as the threshold terpolymer concentration for preventing iron hydroxide precipitation. The smaller the threshold terpolymer concentration for preventing iron hydroxide precipitation, the more excellent the effect of preventing formation of scale with respect to iron hydroxide.

The results of the tests are shown in Table 1.

TABLE 1

| Average molecular weight of terpolymer | Threshold calcium hardness in gel formation (mg CaCO$_3$/liter) | Threshold terpolymer concentration for preventing calcium phosphate precipitation (mg/liter) | Threshold terpolymer concentration for preventing iron hydroxide precipitation (mg/liter) |
|---|---|---|---|
| 100,000 | 1,000 | 10 | 4 |
| 50,000 | 1,000 | 9 | 4 |
| 30,000 | 1,000 | 9 | 4 |
| 26,000 | 1,000 | 7 | 4 |
| 16,000 | 1,000 | 6 | 4 |
| 13,000 | 800 | 6 | 4 |
| 11,000 | 600 | 6 | 5 |
| 8,000 | 500 | 7 | 6 |
| 6,000 | 500 | 7 | 8 |

As shown in Table 1, the greater the molecular weight of the terpolymer of isoprenesulfonic acid, acrylic acid and 2-hydroxyethyl methacrylate (the ratio of the amounts by mole: 20/70/10), the smaller the tendency to form gel with calcium ion and the more excellent the effect of preventing formation of scale with respect to iron hydroxide. On the other hand, the greater the molecular weight, the smaller the effect of preventing formation of scale with respect to calcium phosphate. The stable excellent effect was exhibited in the range of the average molecular weight of 6,000 to 26,000. From these results of the tests, it is shown that, in the water system having a calcium hardness, the optimum range of the average molecular weight for exhibiting the excellent effect of preventing formation of scale by the addition of the terpolymer with respect to both of calcium phosphate and iron hydroxide is 6,000 to 26,000.

Example 2

Decomposition of a Terpolymer with Ozone

As clearly shown in Example 1, the optimum range of the average molecular weight of the terpolymer of isoprenesulfonic acid, acrylic acid and 2-hydroxyethyl methacrylate (the ratio of the amounts by mole: 20/70/10) as the scale inhibitor is 6,000 to 26,000. In accordance with this knowledge, a terpolymer of isoprenesulfonic acid, acrylic acid and 2-hydroxyethyl methacrylate (the ratio of the amounts by mole: 20/70/10) having an average molecular weight of 13,000 was synthesized. This terpolymer was added to desalted water and 1 liter of a 200 mg/liter aqueous solution of the terpolymer was prepared. The prepared aqueous solution was placed in a 1 liter beaker, which was then placed in a thermostatted water bath kept at 30° C. Ozone generated by an ozone generator [manufactured by ASAHI TECHNIGLASS Co,. Ltd.; LABOZONE 250 type] was blown into the aqueous solution in the beaker at a rate of 50 mg/hour through a gas dispersion tube made of a glass filter. Samples of the aqueous solution were taken out at a specific time interval and the average molecular weight of the terpolymer was measured in accordance with GPC. In accordance with the same procedures as those conducted in Example 1, the threshold calcium hardness in gel formation, the threshold terpolymer concentration for preventing calcium phosphate precipitation and the threshold terpolymer concentration for preventing iron hydroxide precipitation were obtained. The results are shown in Table 2.

TABLE 2

| Time of contact with ozone (hour) | Average molecular weight of terpolymer | Threshold calcium hardness in gel formation (mg CaCO$_3$/liter) | Threshold terpolymer concentration for preventing calcium phosphate precipitation (mg/liter) | Threshold terpolymer concentration for preventing iron hydroxide precipitation (mg/liter) |
|---|---|---|---|---|
| 0 | 13,000 | 800 | 6 | 4 |
| 0.25 | 10,700 | 600 | 6 | 5 |
| 0.60 | 7,500 | 500 | 7 | 6 |
| 0.75 | 7,100 | 500 | 7 | 7 |
| 1.0 | 6,000 | 400 | 7 | 8 |
| 1.5 | 5,000 | 400 | 7 | 10 |
| 10.0 | 2,400 | <100 | 8 | >12 |

As shown in Table 2, the terpolymer of isoprenesulfonic acid, acrylic acid and 2-hydroxyethyl methacrylate (the ratio of the amounts by mole: 20/70/10) was decomposed with ozone. The longer the time of contact with ozone, the more the average molecular weight decreased. When the average molecular weight decreased, gel with calcium ion tended to be formed and the effect of preventing formation of scale with respect to iron hydroxide decreased. On the other hand, the effect of preventing formation of scale with respect to calcium phosphate did not decrease much when the average molecular weight decreased. It is shown by the above results that, when the disinfection treatment is conducted with ozone in a water system using the terpolymer of isoprenesulfonic acid, acrylic acid and 2-hydroxyethyl methacrylate (the ratio of the amounts by mole: 20/70/10) as the scale inhibitor, it is sufficient that the average molecular weight of the terpolymer is maintained at 6,000 or greater and that the period of time of contact of the terpolymer with ozone is kept at 1 hour or shorter when the terpolymer having the average molecular weight of 13,000 was used and ozone is blown into water at a rate of 50 mg/liter/hour.

Example 3

Decomposition of a Copolymer with Ozone

In place of the terpolymer of isoprenesulfonic acid, acrylic acid and 2-hydroxyethyl methacrylate (the ratio of the amounts by mole: 20/70/10) used in Example 2, a copolymer of acrylic acid and acrylamido-2-methylpropanesulfonic acid (the ratio of the amounts by mole: 90/10) having an average molecular weight of 8,000 was used. The copolymer was brought into contact with ozone for 10 hours and the average molecular weight of the copolymer, the threshold calcium hardness in gel formation, the threshold terpolymer concentration for preventing calcium phosphate precipitation and the threshold terpolymer concentration for preventing iron hydroxide precipitation were obtained in accordance with the same procedures as those conducted in Example 2.

Example 4

Decomposition of a Copolymer with Ozone

In place of the terpolymer of isoprenesulfonic acid, acrylic acid and 2-hydroxyethyl methacrylate (the ratio of the amounts by mole: 20/70/10) used in Example 2, a copolymer of acrylic acid and 3-allyloxy-2-hydroxypropanesulfonic acid (the ratio of the amounts by mole: 85/15) having an average molecular weight of 10,700 was used. The copolymer was brought into contact with ozone for 10 hours and the average molecular weight of the copolymer, the threshold calcium hardness in gel formation, the threshold terpolymer concentration for preventing calcium phosphate precipitation and the threshold terpolymer concentration for preventing iron hydroxide precipitation were obtained in accordance with the same procedures as those conducted in Example 2.

Example 5

Decomposition of a Copolymer with Ozone

In place of the terpolymer of isoprenesulfonic acid, acrylic acid and 2-hydroxyethyl methacrylate (the ratio of the amounts by mole: 20/70/10) used in Example 2, a copolymer of acrylic acid and 3-allyloxy-2-hydroxypropanesulfonic acid (the ratio of the amounts by mole: 80/20) having an average molecular weight of 9,000 was used. The copolymer was brought into contact with ozone for 10 hours and the average molecular weight of the copolymer, the threshold calcium hardness in gel formation, the threshold terpolymer concentration for preventing calcium phosphate precipitation and the threshold terpolymer concentration for preventing iron hydroxide precipitation were obtained in accordance with the same procedures as those conducted in Example 2.

The results of Examples 3 to 5 are shown in Table 3.

mg/liter and the concentration of ozone used for disinfection in the cooling water is 0.2 to 0.5 mg/liter. Therefore, the ratio of the concentrations of the polymeric scale inhibitor to ozone is 20:1 to 150:1. Since measurement of the average molecular weight of a polymer is difficult in a concentration of the polymer of 10 to 30 mg/liter, an aqueous solution of a polymeric scale inhibitor having a concentration of 150 mg/liter was used and the effect of the concentration of the polymer, the rate of supply of ozone and the period of time of contact with ozone on the rate of decomposition of the polymeric scale inhibitor was evaluated. In this test, the ratio of the concentrations of the polymer to ozone was set at a slightly higher value than that of the actual water system. Six types of the terpolymer of isoprenesulfonic acid, acrylic acid and 2-hydroxyethyl acrylate (the ratio of the amounts by mole: 20/70/10) having average molecular weights in the range of 100,000 to 13,000 which were synthesized in Example 1 were placed into desalted water and six aqueous solutions each having a concentration of the terpolymer of 150 mg/liter were prepared. These solutions each in an amount of 10 liters were placed in 10 liter beakers, which were then placed in a thermostatted water bath kept at 30° C. Ozone generated by an ozone generator [manufactured by ASAHI TECHNIGLASS Co,. Ltd.; LABOZONE 250 type] was blown into each aqueous solution in the beaker at a rate of 50 mg/hour (5 mg/liter/hour), 100 mg/hour (10 mg/liter/hour) or 200 mg/hour (20 mg/liter/hour) through a gas dispersion tube made of a glass filter. The average molecular weight of the polymeric scale inhibitors in the aqueous solutions was measured with passage of the time in accordance with GPC. In this manner, the period of time of contact with ozone before the average molecular weight of the polymers decreased to ½ of the initial average molecular weight by decomposition with ozone was obtained. The results are shown in Table 4.

TABLE 3

|  | Time of contact with ozone (hour) | Average molecular weight of copolymer | Threshold calcium hardness in gel formation (mg CaCO$_3$/liter) | Threshold terpolymer concentration for preventing calcium phosphate precipitation (mg/liter) | Theshold terpolymer concentration for preventing iron hydroxide precipitation (mg/liter) |
|---|---|---|---|---|---|
| Example 3 | 0 | 8,000 | <100 | 6 | 10 |
|  | 10.0 | <2,500 | <100 | 7 | >12 |
| Example 4 | 0 | 10,700 | 400 | 9 | 8 |
|  | 10.0 | <2,500 | <100 | 11 | >12 |
| Example 5 | 0 | 9,000 | 800 | 10 | 7 |
|  | 10.0 | <2,500 | <100 | 12 | >12 |

As shown in Table 3, the average molecular weights of the copolymer of acrylic acid and acrylamido-2-methylpropanesulfonic acid and the copolymer of acrylic acid and 3-allyloxy-2-hydroxypropanesulfonic acid both decreased when these copolymers were brought into contact with ozone and the effect of preventing formation of scale decreased with the decrease in the average molecular weight.

Example 6

The Half-Life of the Average Molecular Weight of a Terpolymer

In actual water systems, in general, a polymeric scale inhibitor is added to cooling water in an amount of 10 to 30

TABLE 4

|  | Half-life of average molecular weight (hour) | | |
|---|---|---|---|
| Initial average molecular weight | rate of supply of ozone 5 mg/liter/hour | rate of supply of ozone 10 mg/liter/hour | rate of supply of ozone 20 mg/liter/hour |
| 100,000 | 70 | 17 | 4.0 |
| 50,000 | 68 | 18 | 4.5 |
| 30,000 | 65 | 16 | 3.5 |
| 26,000 | 72 | 16 | 4.5 |

TABLE 4-continued

| | Half-life of average molecular weight (hour) | | |
|---|---|---|---|
| Initial average molecular weight | rate of supply of ozone 5 mg/liter/hour | rate of supply of ozone 10 mg/liter/hour | rate of supply of ozone 20 mg/liter/hour |
| 16,000 | 75 | 18 | 3.5 |
| 13,000 | 67 | 17 | 4.0 |

As shown in Table 4, the terpolymer of isoprenesulfonic acid, acrylic acid and 2-hydroxyethyl acrylate (the ratio of the amounts by mole: 20/70/10) was decomposed with ozone. The greater the rate of supply of ozone, the greater the rate of decomposition. When the concentration of the terpolymer was held constant, a two-fold increase in the rate of supply of ozone resulted in an about four-fold increase in the rate of decomposition. When the concentration of the terpolymer and the rate of supply of ozone were held constant, the rate of decomposition of the terpolymer was about the same independently of the initial average molecular weight, in other words, the half-life of the average molecular weight was about the same. These data show that, when the initial average molecular weight of the terpolymer, the concentration of the terpolymer and the rate of supply of ozone are decided, the average molecular weight of the terpolymer after the terpolymer is kept in contact with ozone for a specific time can be estimated. When the concentration of the terpolymer is 150 mg/liter and the rate of supply of ozone is 10 mg/liter/hour, the half-life of the average molecular weight is about 17 hours. Under this condition, when terpolymers having an initial average molecular weight of 100,000, 26,000 and 13,000 are used, the periods of time before the average molecular weight decreases to 6,000, which causes the decrease in the effect of preventing formation of scale of the terpolymer with respect to iron hydroxide and the tendency of formation of gel with calcium ion, are 68 hour, 34 hours and 17 hours, respectively.

Example 7

The Relation between the Decrease in the Average Molecular Weight of a Terpolymer and the Effect of Preventing Formation of Scale The terpolymers of isoprenesulfonic acid, acrylic acid and 2-hydroxyethyl methacrylate (the ratio of the amounts by mole: 20/70/10) having average molecular weights of 100,000, 26,000 and 13,000 were dissolved in desalted water and 10 liters each of 150 mg/liter aqueous solutions were prepared. The prepared aqueous solutions were placed in 10 liter beakers, which were then placed in a thermostatted water bath kept at 30° C. Ozone generated by an ozone generator [manufactured by ASAHI TECHNIGLASS Co,. Ltd.; LABOZONE 250 type] was blown into each aqueous solution in the beaker at a rate of 100 mg/hour (10 mg/liter/hour) through gas dispersion tubes made of a glass filter. Since it is known from the results in Example 6 that the half-life of the average molecular weight of the terpolymer is about 17 hours when the rate of supply of ozone is 10 mg/liter/hour, it was estimated that, after the terpolymer having the initial average molecular weight of 100,000 was decomposed due to the contact with ozone for 50 hours, the average molecular weight would be decreased into the range of 6,000 to 26,000 in which the excellent effect for preventing formation of scale would be exhibited. It was also estimated that the terpolymers having the initial average molecular weights of 13,000 and 26,000 would be decomposed with ozone and the average molecular weights would be decreased to 2,500 or smaller. Therefore, the effect of preventing formation of scale would deteriorate.

After 50 hours, the average molecular weight of the terpolymers was measured in accordance with GPC and the terpolymers decomposed with ozone were subjected to the test of formation of gel with calcium ion, the test of prevention of precipitation of calcium phosphate and the test of prevention of precipitation of iron hydroxide in accordance with the same procedures as those conducted in Example 1. The results are shown in Table 5.

TABLE 5

| Initial average molecular weight of terpolymer | Average molecular weight after 50 hours | Threshold calcium hardness in gel formation (mg CaCO$_3$/liter) | Threshold terpolymer concentration for preventing calcium phosphate precipitation (mg/liter) | Threshold terpolymer concentration for preventing iron hydroxide precipitation (mg/liter) |
|---|---|---|---|---|
| 100,000 | 13,500 | 1,000 | 6 | 4 |
| 26,000 | <2,500 | <100 | 7 | >12 |
| 13,000 | <2,500 | <100 | 8 | >12 |

As shown in Table 5, the terpolymers having the average molecular weights of 26,000 and 13,000, which showed the excellent effect of preventing formation of scale before the treatment with ozone, were decomposed with ozone and the average molecular weights decreased. Thus, the effect of preventing formation of scale deteriorated. In contrast, the terpolymer having the initial average molecular weight of 100,000 was decomposed with ozone and the excellent effect of preventing formation of scale was exhibited since the average molecular weight decreased into the optimum range for exhibiting the effect of preventing formation of scale.

The above results shows that, as the process for preventing the decrease in the effect of preventing formation of scale due to the decrease in the average molecular weight by decomposition with ozone, the process comprising the following steps is effective: (1) obtaining the optimum range of the average molecular weight for preventing formation of scale from the relation between the average molecular weight of the polymeric scale inhibitor and the effect of preventing formation of scale; (2) obtaining the relation between the rate of supply of ozone and the rate of decrease in the average molecular weight of the polymeric scale inhibitor in accordance with measurements; (3) obtaining the initial average molecular weight which gives an average molecular weight within the optimum range for preventing formation of scale after the polymeric scale inhibitor is decomposed with ozone from the rate of supply of ozone and the period of time of contact between the polymeric scale inhibitor and ozone, i.e., the period of time in which the added polymeric scale inhibitor stays in the water system before being removed to the outside of the water system, in an actual water system; and (4) adding the polymeric scale inhibitor having the obtained initial average molecular weight.

What is claimed is:

1. A process for preventing formation of scale in a water system which contains ozone for disinfection comprising:
   (i) determining by a measurement an optimum range of an average molecular weight of a polymeric scale inhibitor having a high molecular weight for preventing formation of scale after decomposition of the polymeric scale inhibitor by ozone, from a relationship between the average molecular weight of the polymeric scale inhibitor and an effect of preventing formation of scale, (ii) determining by a measurement a relationship between a rate of supply of the ozone and a rate of decomposition of the polymeric scale inhibitor, (iii) determining an initial average molecular weight of the polymeric scale inhibitor which provides an average molecular weight within the optimum range for preventing formation of scale after the polymeric scale inhibitor is decomposed by the ozone from the rate of supply of the ozone and a period of time of contact between the polymeric scale inhibitor and the ozone; and (iv) adding the polymeric scale inhibitor having the determined initial average molecular weight into the water system.

2. A process according to claim 1, wherein the polymeric scale inhibitor is a polymer selected from the group consisting of (i) a homopolymer and (ii) a copolymer of acrylic acid, methacrylic acid, maleic acid, maleic anhydride and itaconic acid.

3. A process according to claim 1, wherein the polymeric scale inhibitor is a terpolymer soluble in water which is obtained from isoprenesulfonic acid, acrylic acid and 2-hydroxyethyl methacrylate in amounts such that a ratio of amounts by mole of the isoprenesulfonic acid, the acrylic acid and the 2-hydroxyethyl methacrylate is 20/70/10; and wherein the average molecular weight of the polymeric scale inhibitor in step (iii) is 6,000 to 26,000.

4. A process according to claim 1, wherein the polymeric scale inhibitor is a polymer obtained from (a) one or more monomers selected from the group consisting of acrylic acid, methacrylic acid, maleic anhydride, and itaconic acid and salts thereof and (b) one or more monomers selected from the group consisting of (meth)acrylamide, 2-hydroxyethyl (meth)acrylate, 2-hydroxypropyl (meth)acrylate, 2-methyl-1,3-butadiene-1-sulfonic acid, 2-methyl-1,3-butadiene-3-sulfonic acid, 2-methyl-1,3-butadiene-4-sulfonic acid, 1,3-pentadiene-1-sulfonic acid, 1,3-pentadiene-2-sulfonic acid, 1,3-pentadiene-3-sulfonic acid, 1,3-pentadiene-4-sulfonic acid, 2,3-dimethyl-1,3-butadiene-1-sulfonic acid, 2-methyl-1,3-pentadiene-4-sulfonic acid, 3-methyl-1,3-pentadiene-1-sulfonic acid, 2-methyl-1,3-butadiene-1,3-disulfonic acid, 2-methyl-1,3-butadiene-1,4-disulfonic acid, (meth)acrylamido-2-methylethanesulfonic acid, (meth)acrylamido-2-methylpropanesulfonic acid, 3-allyloxy-2-hydroxypropanesulfonic acid, vinylsulfonic acid, phosphooxyethyl (meth)acrylate, acid phosphooxyethylene glycol mono(meth)acrylate, (meth)acrylonitrile, methyl (meth)acrylate, glycidyl (meth)acrylate, N-methylol (meth)acrylamide, styrene, α-methylstyrene, styrenesulfonic acid, vinyltoluene, vinyl acetate and salts thereof; or a neutralized salt of the polymer.

5. A process according to claim 1, wherein the polymeric scale inhibitor is a terpolymer obtained from isoprenesulfonic acid, acrylic acid and 2-hydroxyethyl methacrylate, or a neutralized salt of the terpolymer.

6. A process according to claim 1, wherein the polymeric scale inhibitor is a terpolymer obtained from isoprenesulfonic acid, acrylic acid and 2-hydroxyethyl methacrylate in amounts such that a ratio of amounts by mole of the isoprenesulfonic acid, the acrylic acid and the 2-hydroxyethyl methacrylate is 20/70/10, or a neutralized salt of the terpolymer.

7. A process according to claim 1, wherein the polymeric scale inhibitor is a terpolymer which is soluble in water and which is obtained from isoprenesulfonic acid, acrylic acid and 2-hydroxyethyl methacrylate and has an initial molecular weight of 6,000 or greater, or a neutralized salt of the terpolymer.

8. A process according to claim 1, wherein the polymeric scale inhibitor is a copolymer which is obtained from acrylic acid and acrylamido-2-methylpropanesulfonic acid, or a neutralized salt of the copolymer.

9. A process according to claim 1, wherein the polymeric scale inhibitor is a copolymer which is obtained from acrylic acid and acrylamido-2-methylpropanesulfonic acid in amounts such that a ratio of amounts by mole of the acrylic acid to the acrylamido-2-methylpopanesulfonic acid is 90/10, or a neutralized salt of the copolymer.

10. A process according to claim 1, wherein the polymeric scale inhibitor is a copolymer which is obtained from acrylic acid and 3-allyloxy-2-hydroxypropanesulfonic acid, or a neutralized salt of the copolymer.

11. A process according to claim 1, wherein the polymeric scale inhibitor is a copolymer which is obtained from acrylic acid and 3-allyloxy-2-hydroxypropanesulfonic acid in amounts such that a ratio of amounts by mole of the acrylic acid to the 3-allyloxy-2-hydroxypropanesulfonic acid is 85 to 80/15 to 20, or a neutralized salt of the copolymer.

12. A process according to claim 1, wherein a rate of supply of the ozone into the water system is 0.2 to 50 mg/liter/hour.

13. A process according to claim 1, wherein the polymeric scale inhibitor is in a concentration of 10 to 150 mg/liter in the water system.

14. A process for preventing formation of scale which comprises adding, into a water system which contains ozone for disinfection, a polymeric scale inhibitor having a high molecular weight, the polymeric scale inhibitor having an average molecular weight within an optimum range for preventing formation of scale after the polymeric scale inhibitor is decomposed with ozone, wherein said polymeric scale inhibitor is a copolymer which is obtained from acrylic acid and 3-allyloxy-2-hydroxypropanesulfonic acid, or a neutralized salt of the copolymer.

15. A process according to claim 14, wherein a rate of supply of the ozone into the water system is 0.2 to 50 mg/liter/hour.

16. A process according to claim 14, wherein the polymeric scale inhibitor is in a concentration of 10 to 150 mg/liter in the water system.

17. A process for preventing formation of scale which comprises adding, into a water system which contains ozone for disinfection, a polymeric scale inhibitor having a high molecular weight, the polymeric scale inhibitor having an average molecular weight within an optimum range for preventing formation of scale after the polymeric scale inhibitor is decomposed with ozone, wherein said polymeric scale inhibitor is a copolymer which is obtained from acrylic acid and 3-allyloxy-2-hydroxypropane-sulfonic acid in amounts such that a ratio of amounts by mole of the acrylic acid to the 3-allyloxy-2-hydroxypropanesulfonic acid is 85 to 80/15 to 20, or a neutralized salt of the copolymer.

18. A process according to claim 17, wherein a rate of supply of the ozone into the water system is 0.2 to 50 mg/liter/hour.

19. A process according to claim 17, wherein the polymeric scale inhibitor is in a concentration of 10 to 150 mg/liter in the water system.

* * * * *